United States Patent [19]

Conner et al.

[11] 3,874,281
[45] Apr. 1, 1975

[54] AUTOMATIC BATT PACKER AND METHOD OF PACKING

[75] Inventors: Joseph R. Conner; George E. Mayer; Thomas F. Shovlin, all of Minneapolis, Minn.

[73] Assignee: Bemis Company, Inc., Minneapolis, Minn.

[22] Filed: May 25, 1973

[21] Appl. No.: 363,964

[52] U.S. Cl................................. 100/35, 100/179
[51] Int. Cl............................................. B30b 1/32
[58] Field of Search....... 100/35, 49, 215, 218, 226, 100/240, 245; 53/24, 124 D

[56] References Cited
UNITED STATES PATENTS
3,601,040  8/1971  Steinberg........................... 100/179

Primary Examiner—Harvey C. Hornsby
Assistant Examiner—Robert Pons
Attorney, Agent, or Firm—Dugger, Johnson & Westman

[57] ABSTRACT

A method of compressing batts into a bale size load in a compression packer machine that has a bottom press plate at one end of a loading chamber, a top frame portion at the opposite end of the chamber, a vertically reciprocal movable press plate assembly that includes a movable press plate extendable generally horizontally longitudinally across the chamber and retractable out of the chamber, a vertically reciprocal precompression assembly that includes precompression fingers extendable generally horizontally longitudinally across the chamber and retractable out of the chamber, and a ram assembly for moving compressed batts out of the chamber wherein a first series of uncompressed batts are successively conveyed into the loading chamber to be supportingly carried by the movable press plate as it is indexed vertically downwardly in the chamber; next the precompression fingers are moved into the chamber between the first series of batts and the top portion and as a second series of batts are successively conveyed into the chamber to be supportingly carried by the fingers, index the movable press plate and fingers downwardly and retract the movable press plate when it is adjacent the bottom press plate whereby the first series is precompressed between the bottom press plate and fingers; thence moving the movable press plate into the chamber between the second series and the top frame portion, successively conveying a third series of batts onto the movable press plate to be supportingly carried thereby while indexing the movable press plate downwardly to compress the first and second series and retracting the fingers from between the first and second series. The last mentioned indexing movement is stopped for a dwell period when the first and second series are fully compressed and the ram assembly ejects the fully compressed first and second series from the loading chamber. A conveyor conveys the batts into the loading chamber adjacent the top frame portion.

24 Claims, 7 Drawing Figures

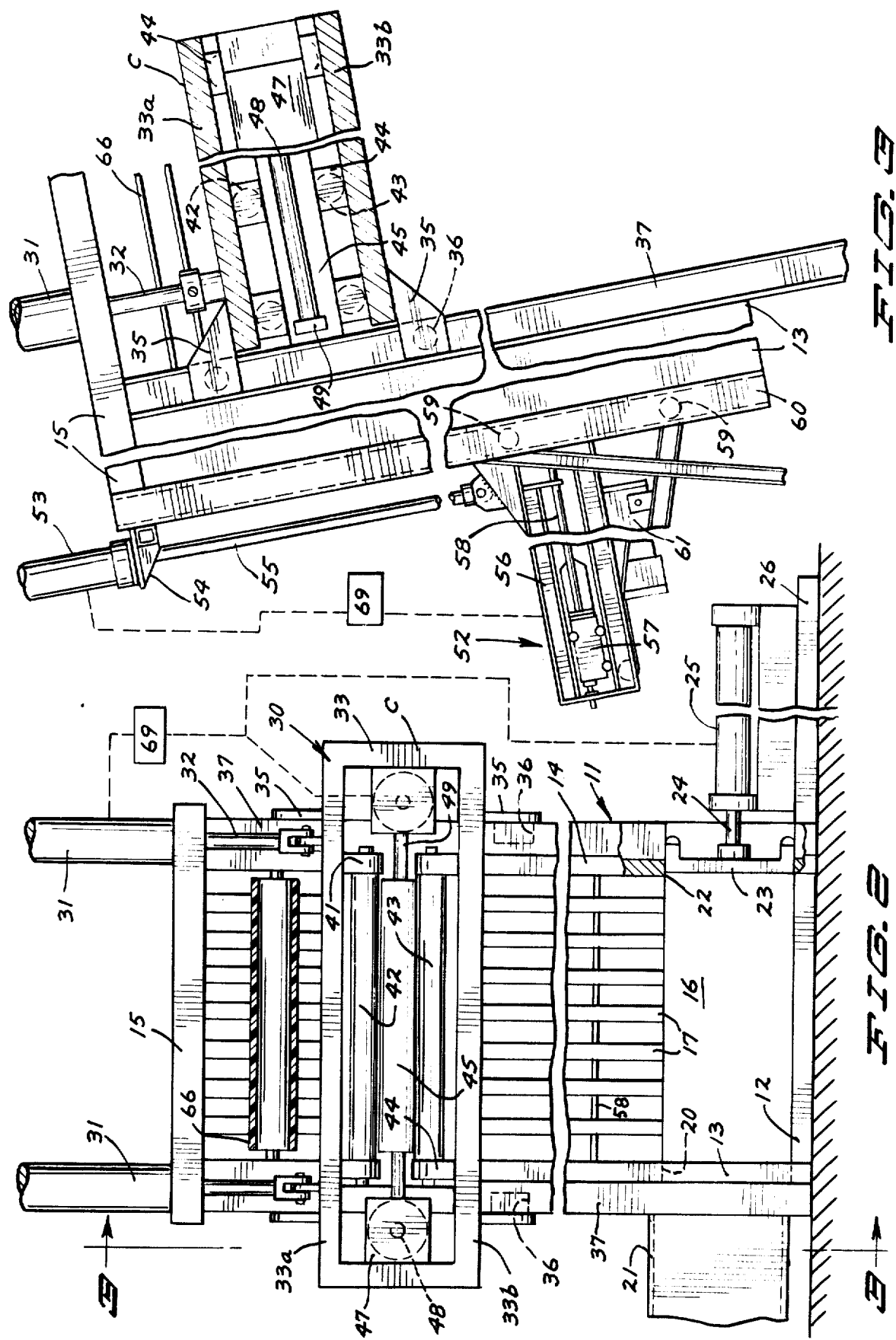

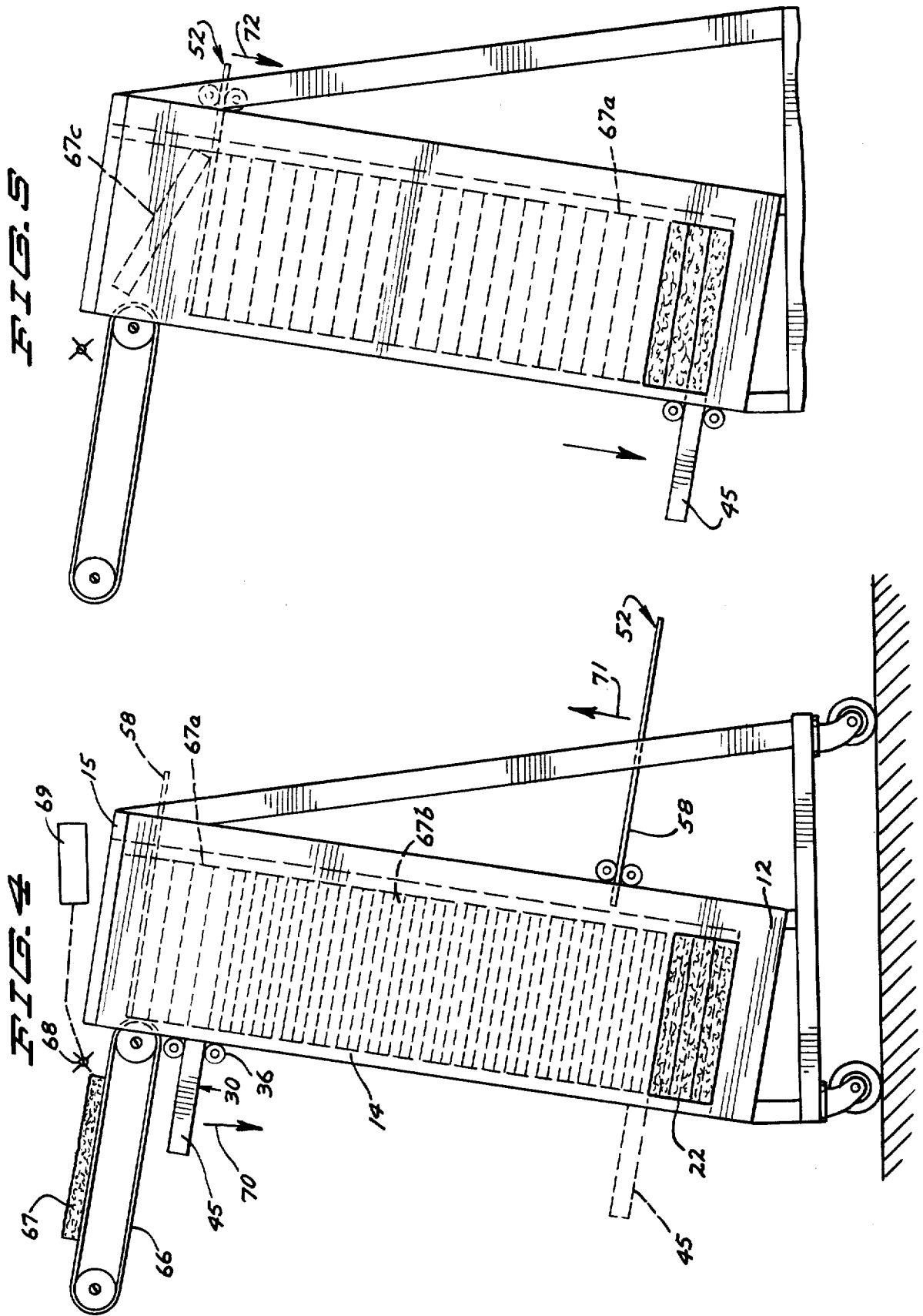

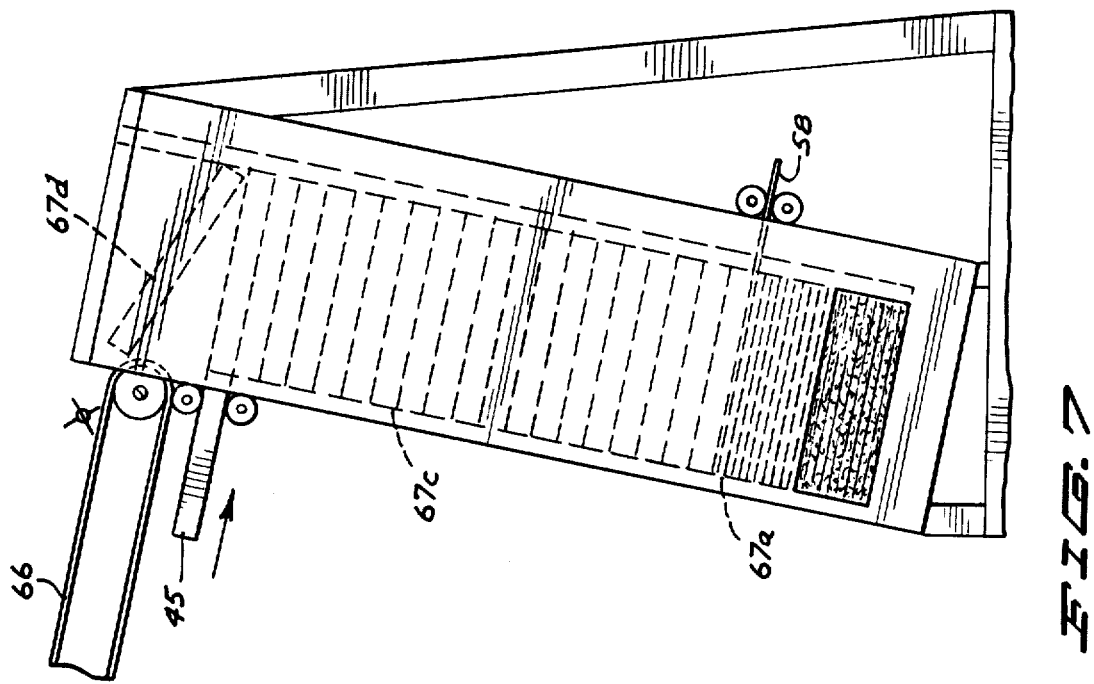
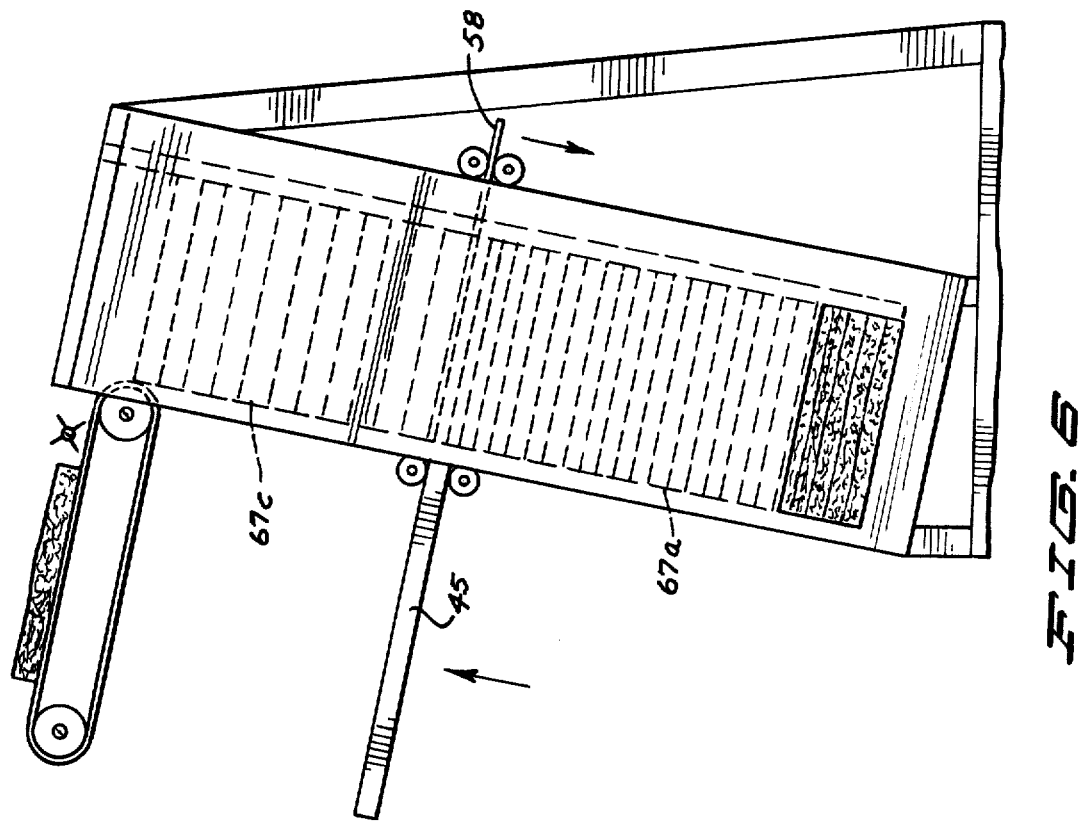

AUTOMATIC BATT PACKER AND METHOD OF PACKING

BACKGROUND OF THE INVENTION

A method of first precompressing about a half load of batts and thence compressing a full load of batts that includes the half load to obtain a fully compressed bale load.

In the prior art, it is old to use a compression packer that utilizes precompression fingers and a vertically reciprocal press plate for first precompressing a partial load of batts and then fully compress a full load of batts, for example, see U.S. Pat. No. 3,601,040, granted Aug. 24, 1971. However, with such prior art apparatus, first the loading chamber is loaded with a first series of batts which are precompressed and then after the precompression step a second series of batts is loaded and thereafter the movable press plate is moved to fully compress both series, the batts being loaded from the bottom up. As a result, during the time that each of the precompression and movable press plate assemblies are being moved downwardly and the ram assembly is being operated during the compressed batt load ejection step, time delays are encountered during which no loading of batts into the chamber is taking place. In order to overcome problems such as the above, as well as others, this invention has been made.

SUMMARY OF THE INVENTION

A method of compressing batts in a compression packer which includes loading a second series of batts onto precompression fingers while the fingers are precompressing a first series of batts, loading a third series of batts onto a press plate while the press plate is compressing the first and second series of batts, and ejecting the fully compressed first and second series of batts during the period of time that at least a majority of the third series is on the press plate.

One of the objects of this invention is to provide a new and novel method of compressing batts to decrease the time for completing a cycle for compressing a bale load of batts. Another object of this invention is to provide a new and novel method of compressing batts wherein some batts are progressively being further compressed in a loading chamber while others are being conveyed into the loading chamber. An additional object of this invention is to provide a new and novel method of compressing batts in a loading chamber wherein a first plurality of batts are being compressed by a batt compressing member being indexed downwardly as additional batts are conveyed one by one into the top part of the loading chamber to be supportingly carried by the compressing member as it is moved downwardly.

DESCRIPTION OF THE DRAWINGS

FIG. 1 is a diagrammatic illustration of the steps of this invention for compressing a plurality of batts into a bale;

FIG. 3 is a side view of the apparatus of FIG. 2, vertically intermediate and longitudinally intermediate portions of the frame forming the loading chamber and longitudinally intermediate portions of the precompression finger and movable press plate assemblies being broken away;

FIG. 4 is a diagrammatic illustration of the apparatus wherein the press plate assembly is at its maximum elevation in an extended position, and the precompression finger assembly is at its lowermost elevation, in a retracted position in the predominently solid line showing, and the precompression finger assembly is at its maximum elevation and the press plate assembly is at its load eject position in the predominently dotted line showing;

FIG. 5 illustrates the relative positions of the press plate and precompression finger assemblies at a time in a load compressing cycle subsequent to the positions indicated by FIG. 4, and subsequent to a compressed load having been ejected from the loading chamber, both of the assemblies being in their extended positions;

FIG. 6 illustrates relative positions of the press plate and precompression finger assemblies in a load compressing cycle at a time subsequent to that shown in FIG. 5; and FIG. 7 illustrates the relative positions of the press plate and precompression finger assemblies in a load compressing cycle at a time subsequent to that indicated in FIG. 6 and prior to that of FIG. 4.

Figure 2:
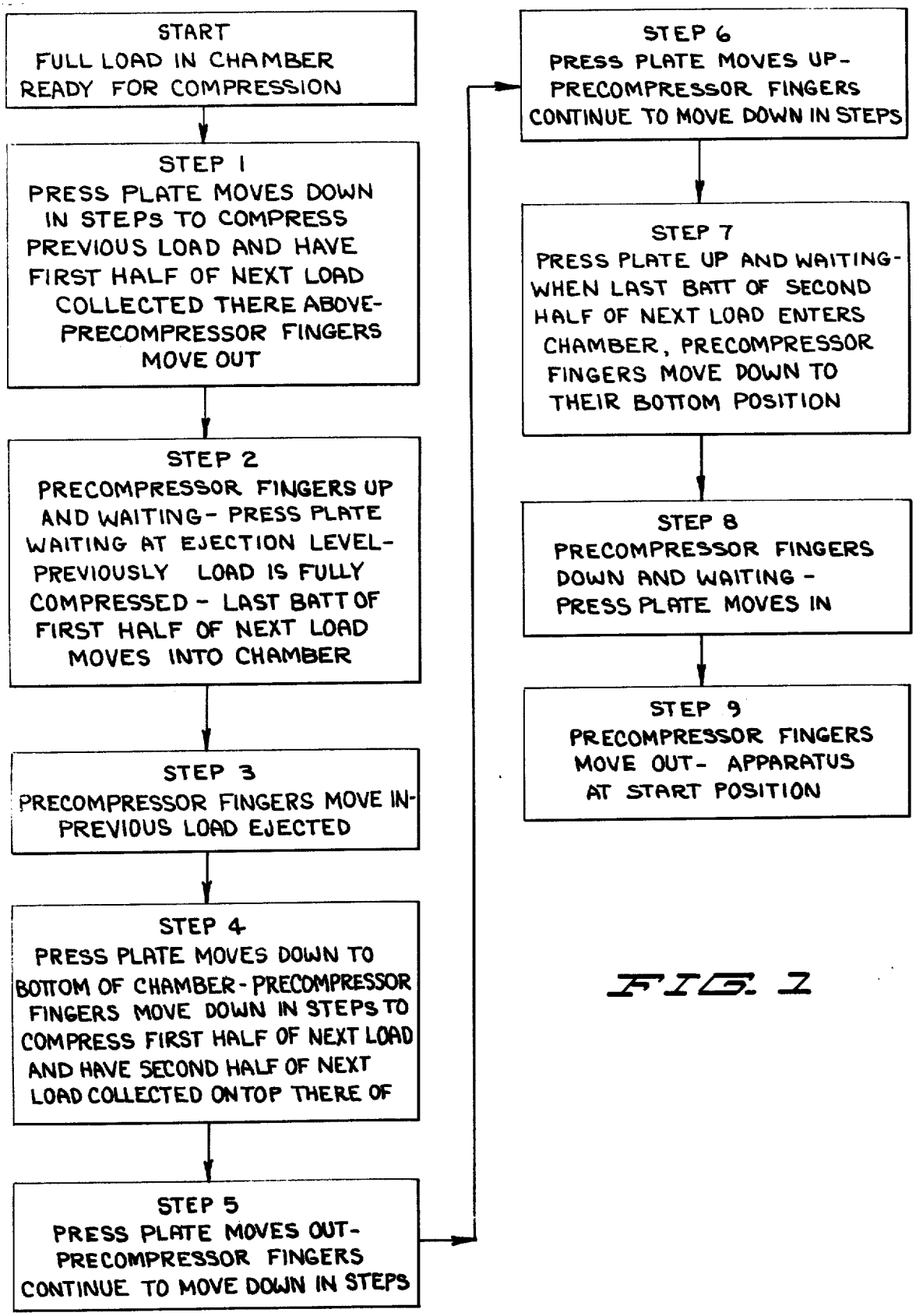
FIG. 2 is a front view of apparatus suitable for carrying out the method of this invention, portions of the apparatus being broken away.

Referring now in particular to FIGS. 2 and 3, there will now be described apparatus suitable for carrying out the method of this invention, said apparatus including a compression packer unit frame generally designated 11. The frame 11 includes a stationary bottom press plate 12, a top frame portion 15, left and right side plates 13 and 14 respectively extending vertically between the bottom press plate and frame portion 15, a vertical rear plate 16 extending transversely between the side plates and having a bottom edge adjacent the bottom press plate, and a plurality of transversely horizontally spaced, vertical bars 17 extending between the rear plate and the top frame portion. Bars 17 and plate 16 form a back wall. Members 12–17 are joined together to form a loading chamber, the terminology loading chamber referring to the space vertically between the top frame portion 15 and the bottom press plate 12; transversely between plates 13, 14; and longitudinally between the front surface of the rear plate 16 and bars 17, and the front opening that in part is defined by the front edge portions of the side plates and bottom press plate. The lower portion of left side plate 13 is provided with a discharge opening 20 that opens to a discharge chute 21 that is mounted on plate 13 to extend outwardly thereof, the lower edge of opening 20 being at the elevation of the adjacent edge of the bottom press plate. Transversely opposite the discharge opening, the right side plate is provided with a ram opening 22; the ram opening and the discharge opening each being of a size to have a ram 23 move therethrough for moving a compressed bale completely out of the loading chamber and into the discharge chute 21. A piston rod 24 of the piston-cylinder combination 24, 25 is connected to the ram and operated by a cylinder 25 for moving the ram from a datum position of FIG. 2 blocking the opening 22 to a position to the left thereof for having pushed the compressed bale load of batts through the opening 20 into chute 21. The cylinder is mounted by a frame member 26 of frame 11.

Mounted on the frame 11 is a movable press plate assembly, generally designated 30, that includes a pair of piston-cylinder combinations having cylinders 31 mounted on the frame portion 15 to extend thereabove and piston rods 32 that are connected to the subframe 33 of the carriage C. Even though the subframe is illustrated as being box shaped open at longitudinally opposite ends, it is to be understood that it may be of any suitable construction. The rear portion of the subframe mounts a pair of transversely spaced, upper brackets 35, and a pair of transversely spaced lower brackets 35; the brackets on the left side rotatably mounting wheels 36 that are located in a track 37 that in turn is mounted by the left side plate. Similarly, the right side brackets 35 rotatably mount wheels 36 that are located in a track 37 mounted on the right side plate. The top portion 33a of the subframe dependingly mounts a plurality of lugs 41 which in turn mount a plurality of transversely elongated rollers 42 that are in longitudinally spaced relationship to one another. The subframe bottom portion 33b mounts a plurality of upwardly extending lugs 44 which in turn mount a plurality of transversely elongated rollers 43, the rollers 43 being longitudinally spaced from one another. Rollers 42, 43 are mounted for rotation about parallel transverse axes.

Supported by the rollers 42, 43 and located between vertically adjacent pairs of rollers 42 and rollers 43 to extend parallel to the top surface of the bottom press plate is a movable press plate 45. The press plate 45 is of a transverse width to extend substantially the entire transverse distance between the inner vertical surfaces of the side press plates, and of a substantially longer longitudinal length than the distance from the inner surface of the back wall formed by bars 17 and plate 16 and the front opening of the loading chamber. That is, the movable press plate is of a longitudinal length such that when its rear edge is closely adjacent the back wall, the front end portion of the press plate will be supported by a sufficient number of the rollers 42, 43 to retain the bottom surface of the press plate 45 in substantially parallel relationship to the top surface of bottom press plate 12. Further, there are provided sufficient number of rollers that are properly spaced to retain the movable pressplate in a position that its bottom surface is substantially parallel to the bottom press plate 16 when the movable press plate is moved to its retracted position that its rear edge is forwardly of the loading chamber. Accordingly, the subframe mounts a movable press plate for longitudinal reciprocal movement between its extended and retracted positions while retaining the bottom surface of the movable press plate generally parallel to the bottom press plate; and due to the provision of the track 37, the wheels 36 and the brackets 35, the subframe, lugs and rollers 42, 43, the movable press plate has its bottom surface retained generally parallel to the bottom press plate 12 as the piston-cylinder combinations 31, 32 vertically move the subframe from a position that the movable press plate is at its maximum elevation just a short distance below the top frame portion and a position that the movable press plate is at an elevation closely adjacent and just above the bottom press plate. If desired, additional brackets and rollers may be mounted by subframe and tracks respectively to aid in retaining the subframe in proper aligned relationship with the loading chamber as the subframe is moved between its elevated and lowered positions. Cylinders 47 of piston cylinder combinations 47, 48 are mounted by the subframe to move therewith and in fixed positions relative thereto while the piston rods 48 are connected to the press plate 45 by brackets 49 to move the press plate between its extended and retracted positions.

Mounted on the frame 11, is precompression finger assembly, generally designated 52. Since the construction of the precompression assembly is generally of a conventional construction and has been described in U.S. Pat. No. 3,601,040 to which reference may be made, it will only be briefly described herein. The assembly 52 includes a piston-combination having a generally vertical cylinder 53 mounted by a frame member 54 and a piston rod 55 slidably extended through an appropriate aperture in frame member 54. The frame member 54 is mounted on top frame portion 15 to extend rearwardly thereof. The piston rod 55 is attached to a vertically movable subframe 56 which in turn mounts a carriage 57 for longitudinal movement. The carriage mounts a plurality of transversely spaced, longitudinally elongated, rigid fingers 58 to extend forwardly thereof and to be moved therewith, the fingers being spaced so as to be extendable between the bars 17. Suitable rollers (not shown) are mounted by a subframe 56 to have the fingers extend therebetween to aid in retaining the fingers substantially parallel to the bottom press plate. The fingers are longitudinally movable by the carriage between a retracted position that their forward ends are just rearwardly of the front surface of the back wall 16, 17 and a forward extended position that the fingers are closely adjacent the front opening of the loading chamber. Further, the fingers are mounted by carriage 57 and subframe 56 for vertical movement between a position a short distance vertically beneath the top frame portion in its maximum elevated position (see dotted line position of FIG. 4) and a lowered position (solid line position of FIG. 4) substantially above the elevation of the top edge of the ram 23. Rollers 59 are mounted by forward end portions of the subframe 56 to extend into generally vertically tracks 60 that are secured to the side press plates 13, 14 respectively, whereby the subframe 56 and carriage 57 support the fingers to extend generally perpendicular to the front surface of the back wall and parallel to the bottom plate top surface. The motor 61 is mounted on the subframe 56 to move therewith and is connected through a drive chain and sprockets (not shown) to the carriage 57 to reciprocate the carriage between a position the finger front end portions are just rearwardly of the front surface of the back wall and a position closely adjacent the front opening to the loading chamber.

A conveyor 66, which may have its front end portion mounted by frame 11, is provided for conveying batts 67 to be discharged through the compression packer front opening into the loading chamber at an elevation between the press plate 45 at its maximum elevation (see FIG. 7) and the top frame portion 15. A suitable counter 68, for example, a photoelectric unit, is mounted adjacent the conveyor for ascertaining the conveyence of each batt into the loading chamber. The counter 68 is connected to suitable control mechanism 69 which also automatically controls the movement and operation of the movable press plate assembly, the precompression assembly, and the ram assembly in a manner set forth hereinafter.

Suitable apparatus for carrying out the method of this invention having been described, the method will now be set forth.

For purposes of facilitating the description of the method of this invention, it will be assumed that the movable press plate assembly 30 is in its uppermost vertical, generally solid line position of FIG. 4 wherein the press plate has been moved to extended position to extend across the loading chamber just below the conveyor; that the precompression assembly 52 is in its lowermost, retracted, generally solid line position of FIG. 1, and the ram in its datum position of FIG. 2. The precompression assembly in its lowermost position is at an elevation to be spaced from the top surface of the bottom press plate by a distance that is about twice the heighth of the ram opening 22. Further, it will be assumed that the total number of batts (designated 67b) between the movable press plate in its extended maximum elevated position and the bottom press plate is the same as that to be compressed for a single bale load. As will become more apparent hereinafter, batts 67b have already been partially compressed. Further there is a sufficient number of batts 67a on top of the movable press plate so that the top surface of the uppermost batt is at a slight distance below the plane of the upper run of the endless conveyor. Now as an additional uncompressed batt 67 on the endless conveyor is moved past the photoelectric eye 68 the control mechanism 69 applies sufficient quantity of fluid under pressure to the cylinders 31 for moving the movable press plate downwardly (direction of the arrow 70) a distance substantially equal to the height of the uncompressed batt on the conveyor. Further, the control mechanism applies hydraulic fluid to the cylinder 53 for retracting the piston rod 55 and thereby move the precompression assembly upwardly (direction of the arrow 71), and once actuated piston-cylinder 53, 55 continuously moves the precompression assembly upwardly until it is at the uppermost point of its path of travel (elevation of the dotted line precompression fingers 58 shown in FIG. 4). The uppermost position of the precompression fingers is substantially the same as the point of entrance of batt being conveyed into the loading chamber.

When a second batt of the series 67a passes the photoelectric eye 68, the piston-cylinder combinations 31, 32 again moves the movable press plate downwardly by a distance substantially equal to the uncompressed height of the batt. Thus, the movable press plate assembly is indexed downwardly as each batt 67a is moved into a loading chamber and compresses the batts 67b. Since the movable press plate is moved down in steps (indexed) while the precompression assembly is moved upwardly in one continuous motion, the precompression assembly is moved to its uppermost position substantially prior to the time the movable press plate is moved downwardly to a level just above the top of the ram opening. Accordingly, in order to permit the movement of additional batts 67a into the loading chamber to be supportingly carried directly or indirectly on the movable press plate, the precompression fingers 58 are now retained in their retracted position. At the time the movable press plate has been moved down to have its bottom surface slightly below the top edge of the opening 22 (load ejection position), after the movement of the last batt 67a into the loading chamber that actuated the controls to move the movable press plate to the ejection position, the motor 61 is automatically actuated to move the precompression fingers to an extended position to extend longitudinally across the loading chamber such as indicated by the upper dotted line position of said fingers in FIG. 4. Additionally, the last mentioned actuation of the control 69 retains the movable press plate in the load ejection position (dotted line position of the movable press plate shown in FIG. 4) while at the same time automatically applying fluid under pressure to cylinder 25 for moving the ram 23 through the loading chamber to push the fully compressed batts 67b located between the movable press plate and the bottom press plate into the discharge chute 21 whereby the compressed batts 67b are completely pushed out of the loading chamber, and thence move the ram back to its retractedposition shown retracted position FIG. 2. During this period of time the drive to the conveyor has been deactuated. However, upon the return of the ram to its datum position and the movement of the compression fingers to their extended uppermost position, the controls then automatically actuate the drive to the conveyor to move a batt 67c of a series of uncompressed batts 67c into the loading chamber to fall onto the top surfaces of the precompression fingers (located vertically between the precompression fingers and the top of the loading chamber). As each batt 67c moved into the loading chamber passes the photoelectric eye, hydraulic fluid under pressure is applied to cylinder 53 in amounts sufficient to index the precompression fingers vertically downwardly (direction of the arrow 72) by a distance substantially equal to the heighth of the uncompressed batt 67c while hydraulic fluid under pressure is applied to the movable press plate cylinders to index the movable press plate downwardly from its ejection position by about a distance of the heighth of said uncompressed batt 67c. It is to be noted that at this time the number of batts 67a located between the movable press plate and the precompression fingers is equal to one-half of the total number of batts for a fully compressed load; and that there are not batts between the movable press plate and the bottom press plate. The last mentioned indexing movement of the precompression and movable press plates assemblies continues as additional batts 67c (less than a majority of batts 67c) are moved into the loading chamber above the precompression fingers until the movable press plate is moved into abutting or substantial abutting relationship with the bottom press plate (movable press plate in its lowermost position — see FIG. 5). The movement of movable press plate to its lowermost position operates the controls to discontinue the application of fluid under pressure to the cylinders 31 and apply fluid under pressure to cylinders 47 for moving the piston rods 48 to their retracted positions and thereby withdraw the movable press plate from the loading chamber to its retracted position. Suitable retainer brackets (not shown) are mounted on the subframe 33 to prevent batts 66a on the movable press plate from being withdrawn from the loading chamber as the movable press plate moves out of the loading chamber. The movement of the movable press plate out of the loading chamber results in the controls discontinuing the application of fluid under pressure to the cylinders 47 but retaining fluid in the cylinders for holding the movable press plate in its retracted position, and upon the end of the retraction movement of the movable press plate, applying fluid under pressure to the cylinders 31 for moving the movable press plate assembly from its lowermost position to its uppermost position independent of the movement of additional batts 67c into the loading chamber. During the time the movable press plate is retracted from the loading chamber and moved vertically upward to its uppermost position additional batts 67c are moved into the loading chamber above the precompression fingers whereby the stepwise movement of the precompression fingers in a downward direction is continued. This last mentioned stepwise movement of the precompressing fingers results in the batts 67b that are located between the precompression fingers and the bottom press plate being compressed therebetween. The movable press plate dwells in its uppermost retracted position while the precompression fingers are moved in the chamber to their lowermost position (position shown in FIG. 7).

At the time the proper number of batts 67c (desirably the same number as that of batts 66a) have been loaded onto the precompression fingers and the precompression fingers have been moved to their lowermost position, the controls automatically apply hydraulic fluid under pressure to the appropriate ends of the cylinders 47 for extending the piston rods 48 and thereby move the movable press plate into the loading chamber to extend across the loading chamber at its maximum such as indicated in FIG. 7.

Now the next batt 67d moved by the photoelectric eye 68 actuates the controls for retaining the piston rods 47 in their extended position, and apply hydraulic fluid to the cylinders 31 to again start the indexing movement of the movable press assembly in a downward step by step movement as previously indicated. At the time the movable press plate has been moved to its extended position, the controls actuate the motor 61 for retracting the precompression fingers and upon the complete retraction of the precompression fingers, the last mentioned downward indexing movement of the movable press plate compresses the batts 67a, 67c between the movable press plate and the bottom press plate. This is the beginning of the second cycle of operation, the series of batts in the loading chamber (batts 67a, 67c) having been completely compressed at the time all of the batts 66d have been moved into the loading chamber and the movable press plate has again been moved down to its load ejection position. Desirably each of the uncompressed batts 66a, 66b, 66c, 66d are of substantially the same thickness and the number of batts 66d is equal to the number of batts 66a.

In accordance with the method of operation described herein, at the time the movable press plate is being moved upwardly, additional batts are still being moved into the loading chamber; and similarly, when the precompression fingers are moved upwardly, additional batts are continuously being loaded into the loading chamber. Also as each of the movable press plate and the precompression fingers moves downwardly batts are being conveyed into the loading chamber. As a result, a faster mode of operation is achieved than if no provision were made for the loading batts onto the top of the movable press plate. Further, twice the number of batts can be compressed into a single load than if the precompression finger assembly had not been provided.

It is to be mentioned that the structure for mounting the precompression fingers and movable press plate for both reciprocal and vertical movement, and the structure of the ram assembly may be varied considerably from that set forth herein, the particular structure being described merely to facilitate the description of the method of the preferably Further, preferably the loading chamber extends predominently vertically, but is slanted rearwardly in an upwardly direction a slight amount to minimize any tendency for batts in the loading chamber toppling forwardly out of the front opening of the chamber.

Also, even though the power means for vertically reciprocating the precompression finger assembly 52 and the movable press plate assembly 30, and moving the ram 23 and press plate 45 between their extended and retracted positions, has been set forth as being piston cylinder combinations, it is to be understood other suitable drive means may be used, for example, air or other type motors, driven screws and etc. Likewise, even though the power means for moving the precompression fingers between their extended and retracted positions has been set forth as a motor 61, it is to be understood that other suitable drive means may be used, for example piston cylinder combinations, driven screws and etc.

The product of each of the batts may be felt, foam rubber, wool, fiberglass, excelsior, rock wool, cotton, etc. Usually, each of the uncompressed batts is of a height many times smaller than its width and length dimensions.

What is claimed is:

1. In the method of compressing a plurality of batts into a bale load in a loading chamber of a compression packer having a first plate defining one end of the chamber, a frame portion defining the opposite end of the chamber, a movable press plate and precompression fingers, comprising extending the press plate into the chamber between the first plate and the frame portion at a location substantially more closely adjacent the frame portion than the first plate, conveying a first plurality of uncompressed batts, one after the other, into the loading chamber between the frame portion and the press plate extending in the chamber while moving the press plate toward the first plate, thence extending the precompression fingers into the chamber between the frame portion and the first plate at a location more closely adjacent the frame portion than the first plate and opposite the first plurality of batts from the first plate, conveying a second plurality of uncompressed batts, one after another, into the loading chamber between the precompression fingers extended into the chamber and the frame portion while moving the precompression fingers toward the first plate to precompress the first plurality of batts, prior to the completion of the loading of the second plurality of batts, retracting the press plate from the loading chamber, extending the movable press plate into the loading chamber between the second plurality of batts and the frame portion after the second plurality of batts have been conveyed into the chamber, conveying a third plurality of batts into the loading chamber between the frame portion, and the press plate and the second plurality of batts while moving the press plate toward the first plate to fully compress the first and second plurality of batts, after the first and second plurality of batts have been fully compressed between the first plate and press plate, stopping the movement of the press plate toward the first plate and then ejecting the fully compressed first and second plurality of batts from the loading chamber, and retracting the precompression fingers from the loading chamber prior to the ejection step and subsequent to the last mentioned extension of the press plate into the loading chamber.

2. The method of claim 1 further characterized in the steps of moving both the press plate and the precompression fingers toward the first plate with the third plurality of batts therebetween after the ejection step, and after the press plate is closely adjacent the first plate, retracting the press plate from the chamber while continuing the movement of the precompression fingers in the chamber toward the first plate to precompress the third plurality of batts therebetween.

3. The method of claim 1 further characterized in that the movement of each of the precompression fingers and press plate respectively in the chamber toward the first plate is an indexing movement of a distance about the same as the height of an uncompressed batt and is initiated as each batt is conveyed adjacent the chamber to be moved therein.

4. The method of claim 1 further characterized in that the movement of the press plate when extended in the chamber is predominently in a downward direction and that the first batt of the first plurality of batts conveyed into the chamber is supportingly carried by the press plate between the time of the first mentioned extension thereof into the chamber and the first retraction thereof from the chamber.

5. The method of claim 1 further characterized in that each of the first, second and third plurality of batts are of an equal number of batts.

6. The method of claim 1 further characterized in that the minimum spacing of the precompression fingers from the first plate during the movement of the fingers in the chamber toward the first plate is substantially greater than the spacing of the press plate from the first plate when it is stopped for the ejection step.

7. The method of claim 1 further characterized in that the first mentioned retraction of the press plate from the chamber after the first plurality of batts has been conveyed into the chamber is subsequent to the conveyence of at least one of the second plurality of batts into the chamber.

8. The method of claim 1 further characterized in that after the press plate and precompression fingers in the loading chamber moving toward the first plate have been respectively retracted from the loading chamber, said fingers and press plate are returned in one continuous movement to relative locations that they are extended into the loading chamber to move toward the first plate.

9. In the method of compressing a plurality of batts into a bale load in a generally vertical loading chamber of a compression packer having a first plate defining the bottom end of the chamber, a top frame portion defining the opposite end of the chamber, a movable press plate and precompression fingers, comprising successively loading a first plurality of batts, one after the other, into the loading chamber on top of the press plate with the press plate extended in the chamber; moving the press plate from adjacent the frame portion downwardly toward the chamber bottom as the first plurality of batts is being loaded onto the press plate, and at the same time compressing a second plurality of batts between the bottom of the press plate and the chamber bottom; extending the precompression fingers into the loading chamber between the second plurality of batts and the frame portion after the second plurality of batts has been loaded into the chamber, and thence loading a third plurality of batts into the loading chamber between the precompression fingers and the top frame portion and moving the precompression fingers downwardly in the chamber as the third plurality of batts is moved into the loading chamber.

10. The method of claim 9 further characterized in that after most of the second plurality of batts have been moved into the loading chamber and prior to the completion of the loading of the third plurality of batts into the loading chamber, the above mentioned downwardly movement of the press plate in the chamber includes moving the press plate downwardly to a load ejection position a preselected distance above the chamber bottom that the first plurality of batts is fully compressed, and after the movement to the ejection position, mechanically ejecting the fully compressed plurality of batts from the loading chamber.

11. The method of claim 10 further characterized in that after the ejection step, withdrawing the press plate from the loading chamber, moving the press plate upwardly out of the loading chamber, and then moving the press plate into the loading chamber between the third plurality of batts and the top frame portion after the completion of the loading of the third plurality of batts into the chamber.

12. The method of claim 11 further characterized in that the above mentioned movement of the press plate upwardly is during the interval of time of the above mentioned movement of the precompression fingers downwardly in the chamber.

13. In the method of compressing a plurality of batts into a bale load in a generally vertical loading chamber of a compression packer having a first plate defining the bottom end of the chamber, a top frame portion defining the opposite end of the chamber, a movable press plate and precompression fingers, comprising successively loading a first plurality of batts, one after the other, into the loading chamber on top of the press plate with the press plate extended in the chamber; moving the press plate from adjacent the frame portion downwardly toward the chamber bottom as the first plurality of batts is being loaded onto the press plate, and at the same time compressing a second plurality of batts between the bottom of the press plate and the chamber bottom; stopping the downward movement of the press plate in the chamber a preselected distance from the chamber bottom, and while the downward movement is stopped, ejecting the second plurality of batts from the loading chamber.

14. The method of claim 13 further characterized in moving the precompression fingers into the loading chamber at a location more closely adjacent the top frame portion than the chamber bottom after the first plurality of batts have been loaded onto the press plate and prior to the completion of the ejection step.

15. The method of claim 14 further characterized in loading a third plurality of batts into the loading chamber onto the precompression fingers between the precompression fingers and the top frame portion to be supported by said fingers after said fingers have been moved into the chamber, and moving the precompression fingers toward the chamber bottom as the third plurality of batts is loaded thereon.

16. The method of claim 15 further characterized in that after the completion of the ejection step and during the period of movement of the precompression fingers in the chamber toward the chamber bottom, restarting the movement of the press plate in the chamber toward the chamber bottom, then continuing the downward movement of the press plate until it is closely adjacent the chamber bottom, and thereafter, while the third plurality of batts is being loaded into the chamber, retract the press plate from the chamber so that the second plurality of batts is supported on the chamber bottom and is precompressed between the precompression fingers and the chamber bottom as the precompression fingers have the third plurality of batts loaded thereon.

17. The method of claim 16 further characterized in moving the press plate into the loading chamber between third plurality of batts and the top frame portion after the completion of the loading of the third plurality of batts into the loading chamber, and thence moving the press plate toward the chamber bottom.

18. The method of claim 17 further characterized in retracting the precompression fingers from the loading chamber after the fingers have been moved to a preselected distance from the chamber bottom and after the last mentioned movement of the press plate into the chamber whereby further downward movement of the press plate in the chamber compresses the second and third series of batts between the press plate and chamber bottom.

19. The method of claim 18 further characterized in loading a fourth plurality of batts into the loading chamber on the top of the press plate after the last mentioned movement of the press plate into the loading chamber and while the press plate is moved toward the chamber bottom.

20. The method of claim 18 further characterized in that the downwardly movement of the precompression fingers and the press plate respectively in the chamber is in increments and is automatically initiated in a step by step manner by the movement of a batt into the loading chamber.

21. In the method of compressing a plurality of batts into a bale load in a generally vertical loading chamber of a compression packer having a first plate defining the bottom of the chamber, a top frame portion defining the top end of the chamber, a movable press plate and movable precompression fingers, comprising loading a first and second plurality of batts into the loading chamber, extending the press plate across the loading chamber between the first and second plurality of batts and the frame portion at a location adjacent the frame portion and downwardly spaced therefrom a distance great enough for an uncompressed batt to be loaded thereon, conveying a third plurality of batts into the loading chamber, one after another, onto the top of the press plate to be supportingly carried thereby while indexing the press plate downwardly about one uncompressed batt thickness for each batt conveyed into the chamber to receive each of the third plurality of batts and compress the first and second plurality of batts between the chamber bottom and the press plate, ejecting the thus compressed first and second plurality of batts from the loading chamber; after the completion of the loading of the third plurality of bales onto the press plate, extending the precompression fingers across the loading chamber between the third plurality of batts and the frame portion and positioning the fingers sufficiently below the frame portion for an uncompressed batt being loaded into chamber between the fingers and the frame portion, moving a fourth plurality of batts one after another, into the loading chambers and onto the precompression fingers between the fingers and the frame portion to be supportingly carried thereby while indexing the fingers downwardly about one uncompressed batt thickness for each of the fourth batts conveyed into the chamber, retracting the press plate from the chamber and then moving the press plate upwardly exterior of the loading chamber prior to the completion of the loading of the fourth plurality of batts; after the completion of the loading of the fourth plurality of batts, moving the press plate to extend across the loading chamber between the fourth plurality of batts and the frame portion and thence move the press plate downwardly in the chamber, and after the last mentioned extension of the press plate across the chamber, retracting the precompression fingers from the chamber and moving the precompression fingers upwardly exterior of the chamber to a location adjacent the top of the chamber.

22. The method of claim 21 further characterized in that prior to the ejection of the first and second plurality of batts, the downward movement of the press plate is stopped at a distance the first and second plurality of batts are fully compressed, that the batts are mechanically ejected while the press plate is thus stopped, and after the ejection, index the press plate downwardly, the last mentioned indexing downwardly being prior to a major of the fourth plurality of batts are loaded onto the precompression fingers.

23. The method of claim 20 further characterized in that the above mentioned indexing movement of the fingers downwardly is terminated at a distance from the chamber bottom substantially greater than the distance of the press plate from the chamber bottom when the press plate is stopped.

24. In the method of compressing a plurality of batts into a bale load in a generally vertical loading chamber of a compression packer having a first plate defining the bottom end of the chamber, a top frame portion defining the opposite end of the chamber, a movable press plate and precompression fingers, comprising successively loading a first plurality of batts, one after the other, into the loading chamber on top of the press plate with the press plate extended in the chamber, moving the press plate from adjacent the frame portion downwardly toward the chamber bottom as the first plurality of batts is being loaded onto the press plate, and at the same time compressing a second plurality of batts between the bottom of the press plate and the chamber bottom, the press plate moving step comprising indexing the press plate downwardly in step by step fashion about a distance equal to the height of each batt in timed relationship to the movement of each of the first plurality of batts into the loading chamber.

* * * * *